US010445459B1

(12) United States Patent
Tatara et al.

(10) Patent No.: US 10,445,459 B1
(45) Date of Patent: Oct. 15, 2019

(54) INTERACTIVE ROUTING WITH POLY VIAS

(71) Applicant: Cadence Design Systems, Inc., San Jose, CA (US)

(72) Inventors: Eric Tatara, Chelmsford, MA (US); Brett Neal, Monument, CO (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 128 days.

(21) Appl. No.: 15/688,377

(22) Filed: Aug. 28, 2017

(51) Int. Cl.
*G06F 17/50* (2006.01)
*H05K 1/02* (2006.01)

(52) U.S. Cl.
CPC ...... *G06F 17/5081* (2013.01); *G06F 17/5036* (2013.01); *G06F 17/5072* (2013.01); *G06F 17/5077* (2013.01); *H05K 1/0231* (2013.01); *H05K 1/0298* (2013.01); *H01L 2924/15192* (2013.01); *H05K 2201/10689* (2013.01)

(58) Field of Classification Search
USPC ........................................................ 716/106
See application file for complete search history.

(56) References Cited

U.S. PATENT DOCUMENTS

| 7,100,135 | B2 | 8/2006 | Meyer et al. | |
|---|---|---|---|---|
| 2001/0038612 | A1* | 11/2001 | Vaughn | G06F 17/5077 370/256 |
| 2006/0253819 | A1 | 11/2006 | Meyer et al. | |
| 2010/0205575 | A1* | 8/2010 | Arora | G06F 3/04812 716/122 |
| 2011/0131543 | A1* | 6/2011 | Majumder | G06F 3/0481 716/139 |

\* cited by examiner

*Primary Examiner* — Mohammed Alam
(74) *Attorney, Agent, or Firm* — Foley & Lardner LLP

(57) ABSTRACT

The present embodiments are directed generally to techniques for providing an interactive environment that gives visual feedback and indicators to identify and/or encourage effective sharing of partially used drill sites, all inside a typical etch-edit environment. Such an interactive environment allows designers to effectively leverage and exploit new PCB manufacturing techniques that allow for multi-net use of a single drill hole.

19 Claims, 6 Drawing Sheets

INTERACTIVE ROUTING WITH POLY VIAS

TECHNICAL FIELD

The present embodiments relate generally to electronic circuits and more particularly to techniques for routing traces on printed circuit boards to different layers using shared poly vias.

BACKGROUND

Printed circuit boards (PCBs) can be fabricated using various techniques, with the two most common being either build-up or laminate. With laminate PCBs, when traces need to be routed to different layers using vias, a drill hole through the entire stack of layers of the PCB is required, even when the trace only needs to be routed to an adjacent or a few layers, which can cause waste. New manufacturing technologies allow shared multi-net usage of a single drill hole. The problem is to provide an interactive routing environment that allows designers to effectively share partially used drill sites, all inside a typical etch-edit environment.

SUMMARY

The present embodiments are directed generally to techniques for providing an interactive environment that gives visual feedback and indicators to identify and/or encourage effective sharing of partially used drill sites, all inside a typical etch-edit environment. Such an interactive environment allows designers to effectively leverage and exploit new PCB manufacturing techniques that allow for multi-net use of a single drill hole.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1A:
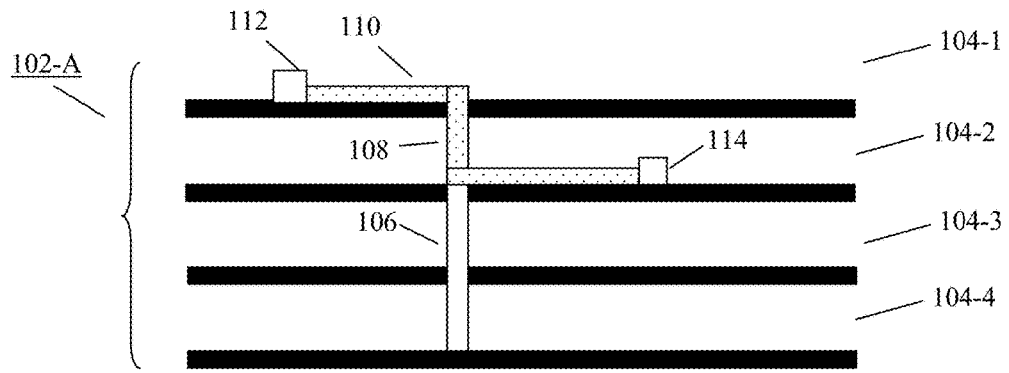
FIGS. 1A to 1C are diagrams illustrating aspects of the present embodiments.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments are directed to techniques for providing an interactive environment that gives visual feedback and indicators to identify and/or encourage effective sharing of partially used drill sites, all inside a typical etch-edit environment. Such an interactive environment allows designers to effectively leverage and exploit new PCB manufacturing techniques that allow for multi-net use of a single drill hole. It should be noted, however, that although the present embodiments will be described in connection with layouts of circuits and nets in circuit structures comprising PCBs, the principles of the present embodiments may be extended to other editing environments for other circuit structures that may benefit from similar manufacturing techniques.

The present applicants have observed that, according to conventional techniques, identifying via-sharing candidates can either be done post-process, or during routing. If done as a post-process, the existing routing may be too dense or too time-consuming to modify for effective via-merging. If done during the routing process, the process requires stopping the routing flow, and doing a very manual user inspection, querying via-by-via, greatly inflating the cycle time for the physical layout process.

An aspect of the present embodiments, therefore, is to provide a dynamic feedback environment that provides a series of visual indicators for drill hole sharing for vias based on the current selected network and layer(s). Such an environment can also provide cursor-snap features to guide the interactive edits so as to quickly and properly align routing/vias onto the existing drill holes. An advantage of this methodology is that it allows for efficient reuse of drill hole locations without increasing the design cycle time. This reduces overall design area and provides a cost benefit for most products leveraging this technology, while removing the cost burden of increased design effort.

Figure 1B:
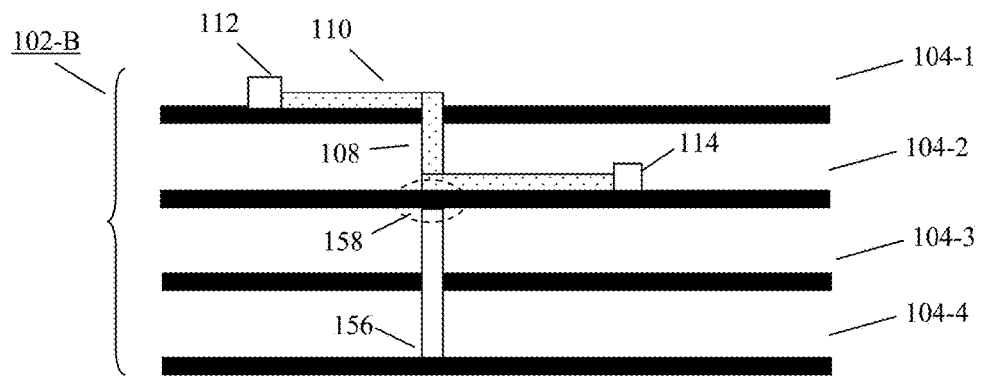
Figure 1C:
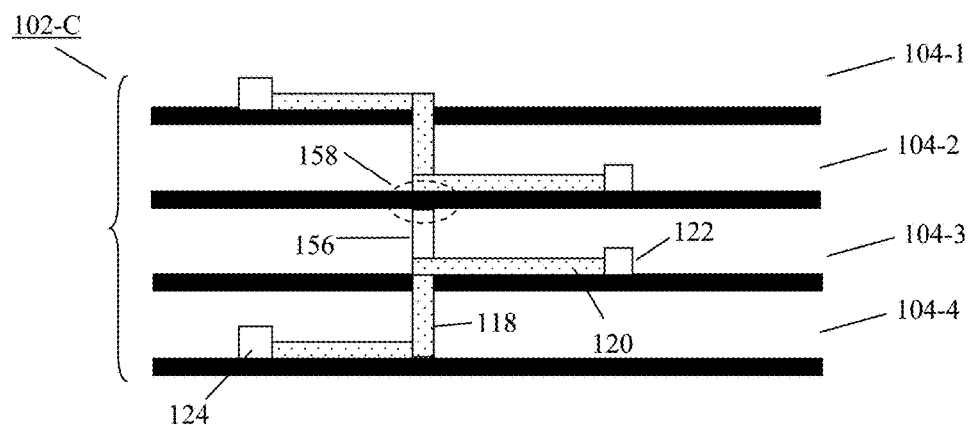

FIGS. 1A to 1C are diagrams illustrating aspects of interactive routing with poly vias according to the present embodiments. More particularly, FIGS. 1A to 1C are side views of a printed circuit board (PCB) 102-A or laminate substrate having four layers 104-1, 104-2, 104-3 and 104-4. In one possible example, layers 104 are comprised of electrically conductive material with a layer of dielectric material between the layers of electrically conductive material. The laminate substrate or PCB 102-A can include electrically conductive traces in the conductive layers and through the dielectric material to achieve the appropriate routing interconnections. In an example, the conductive material is a metal (e.g., copper) and the dielectric material is a composite fiber material (e.g., pre-preg).

As shown in FIG. 1A, PCB 102-A further includes a conventional plated drill hole 106 which passes through all four layers 104-1, 104-2, 104-3 and 104-4. A via 108 is formed using drill hole 106, which allows an electrically conductive trace 110 (e.g., part of a net) to connect a pin 112 (e.g., electrically connected to an electronic component) on layer 104-1 to another pin 114 on layer 104-2. However, after via 108 is formed using drill hole 106 and used by the net to which trace 110 belongs, no other nets can use drill hole 106, even though the rest of drill hole 106 between layers 104-2 and 104-4 is unused.

FIG. 1B illustrates aspects of new technologies that are leveraged by the present embodiments. As shown, PCB 102-B in this example includes multi-net drill hole 156 through all four layers 104-1, 104-2, 104-3 and 104-4. Drill hole 156 in this example includes a spacer 158 or isolation cut between layers 104-2 and 104-3. As in FIG. 1A, PCB 102-B includes via 108 formed using drill hole 156, which allows trace 110 to connect pin 112 on layer 104-1 to 114 on layer 104-2. Differently from PCB 102-A, however, the spacer 158 in drill hole 156 allows for one or more other vias to be formed for one or more other nets using drill hole 156 while the traces using these different vias can remain electrically isolated from each other. It should be noted that, although only one spacer 158 is shown in FIG. 1B, there can be two or more spacers 158 or isolation cut, which allows three or more different nets or shared poly vias to use the same drill hole 156. As used herein, the term "shared poly via" refers to a poly via (e.g., a via formed from a single drill hole using the new technology that allows two or more nets to use the same drill hole) to which two or more different nets are attached.

For example, as shown in FIG. 1C, PCB 102-C includes another via 118 formed using drill hole 156, which allows trace 120 (e.g., part of a different net than the net of trace 110) to connect a pin 122 on layer 104-3 to another pin 124 on layer 104-4.

Figure 2:
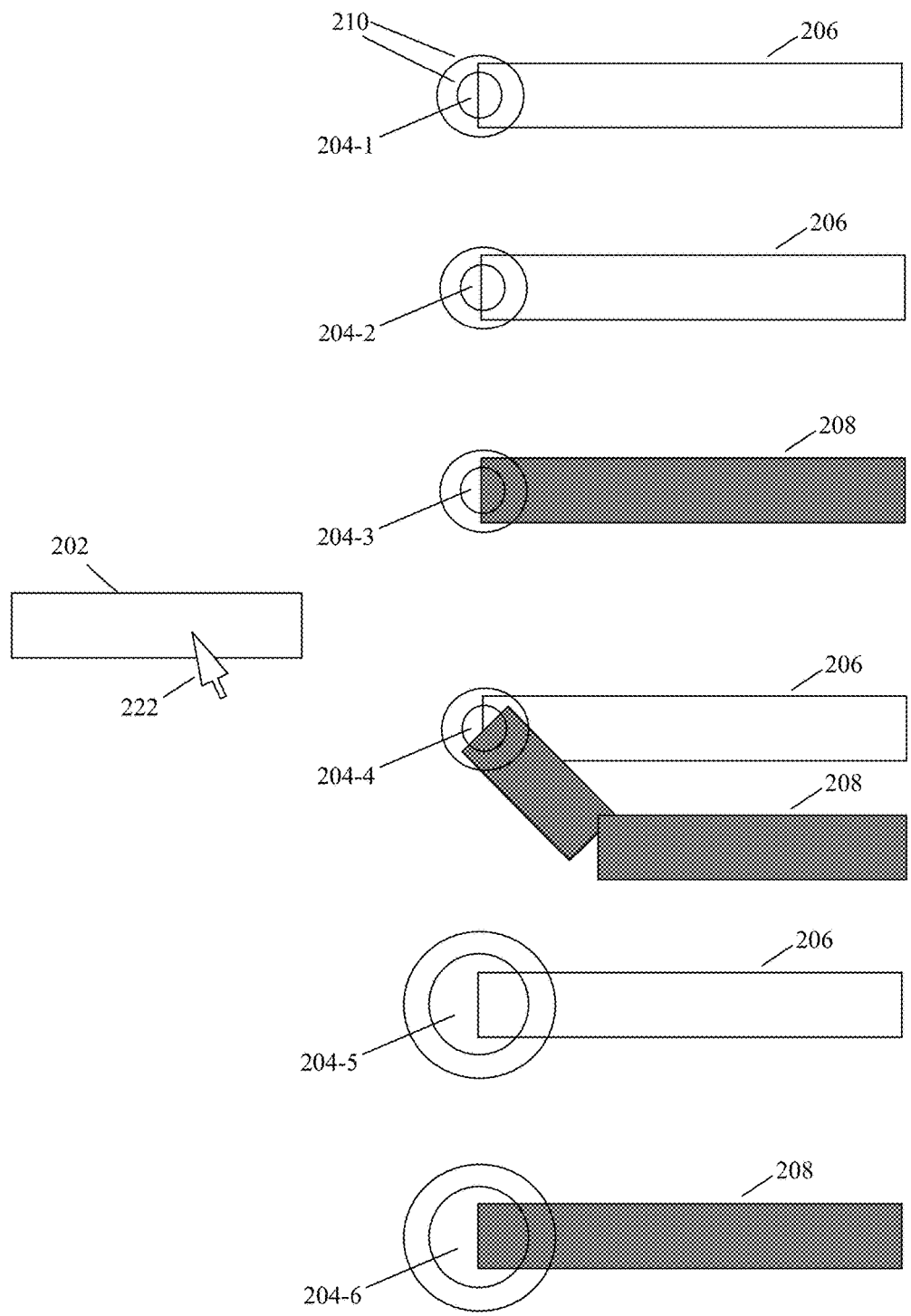
FIG. 2 illustrates conventional indicators for routing traces using vias.

FIG. 2 illustrates conventional displays and graphical indicators that are provided during routing and/or dynamic editing of PCB layouts using vias.

In this example, a person editing the layout wants to route the trace 202 currently on layer 1 (e.g., the top layer) of a multi-layer PCB to another (e.g., lower layer) layer by selecting trace 202 by pointing and clicking or hovering cursor 222 on or over the display of trace 202, for example. For ease of explanation of certain aspects of the present embodiments, the display also contains six nearby vias 204-1 to 204-6 that are accessible in layer 1. Commonly, as shown, vias are drawn as two circles 210, with the inner circle showing the drill hole, and the outer circle showing the conductive pad for the via.

As further shown, each of the vias 204-1 to 204-6 has one or more associated traces already connected to them, with traces 206 in the same layer as trace 202 being shown in the same color as the color of trace 202, and traces 208 in different layers from trace 202 being shown in different colors (it should be apparent that there can therefore be several different layers and colors than the two layers and colors shown in this example). However, other than these color indications, even with PCB designs incorporating new technologies enabling shared vias, no other information about the vias is shown, such as whether the via uses a drill hole that is a candidate for use as a shared poly via. Instead, the user is required to use other means, such as a via-by-via query, to identify which nearby via sites 204 are candidate locations for use as shared poly vias.

Figure 3:
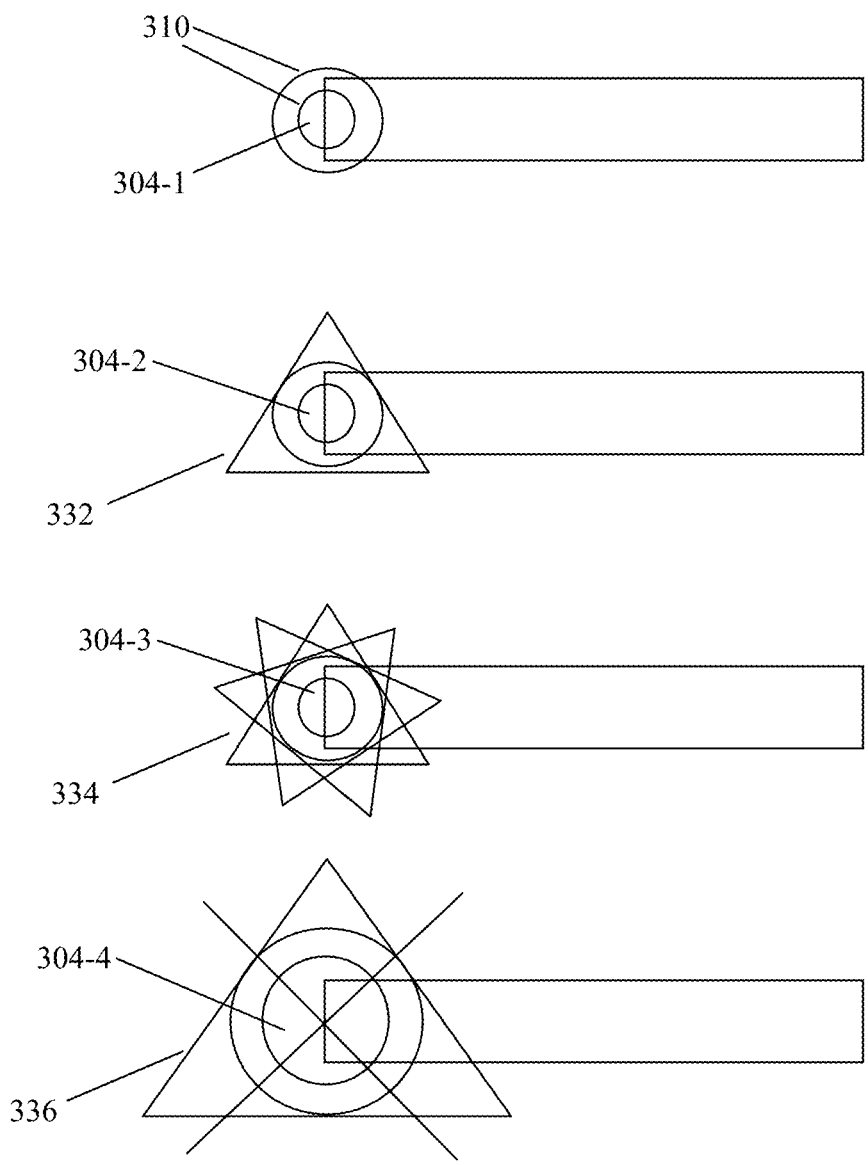
FIG. 3 illustrates an example of graphical indicators for routing traces using poly vias according to the embodiments.

FIG. 3 illustrates example graphical indicators for assisting in leveraging new technologies when performing interactive routing with poly vias according to embodiments.

In this example, as shown in FIG. 3, an existing via 304-1 that is not a candidate for use as a shared poly via is displayed in the conventional fashion using concentric circles 310 without any special indicators, A triangle FIG. 332 (drawn surrounding the circular pad) indicates an existing via 304-2 having layers available for use by the current selected network and layer, and thus its drill hole is a candidate for use as a poly via. The user should route dynamic traces or vias so as to connect to vias having triangles drawn surrounding them when possible.

A star triangle FIG. 334 is similar to the triangle case, but also indicates the existing via 304-3 has the same network as the selected network at the cursor. The user should also connect to vias having star triangles drawing surrounding them when possible.

A triangle with an "X" overlay 336 indicates an existing via 304-4 that qualifies as a shared poly via due to layer-range criteria, but does not qualify due to hole-size mismatch. This encourages the user to modify the selected via hole-size if possible, so that reuse with the existing via can be done. Users are not encouraged to route dynamic traces or vias so as to connect to vias having triangles with an "X" surrounding them unless they can modify the hole size of the indicated via.

It should be noted that the display of poly via figures such as FIGS. 332, 334 and 336 can be dynamic, and can change depending on the current routing network and layer. The poly via figures can disappear when the editing dynamics are completed for the current routing trace or via.

Figure 4:
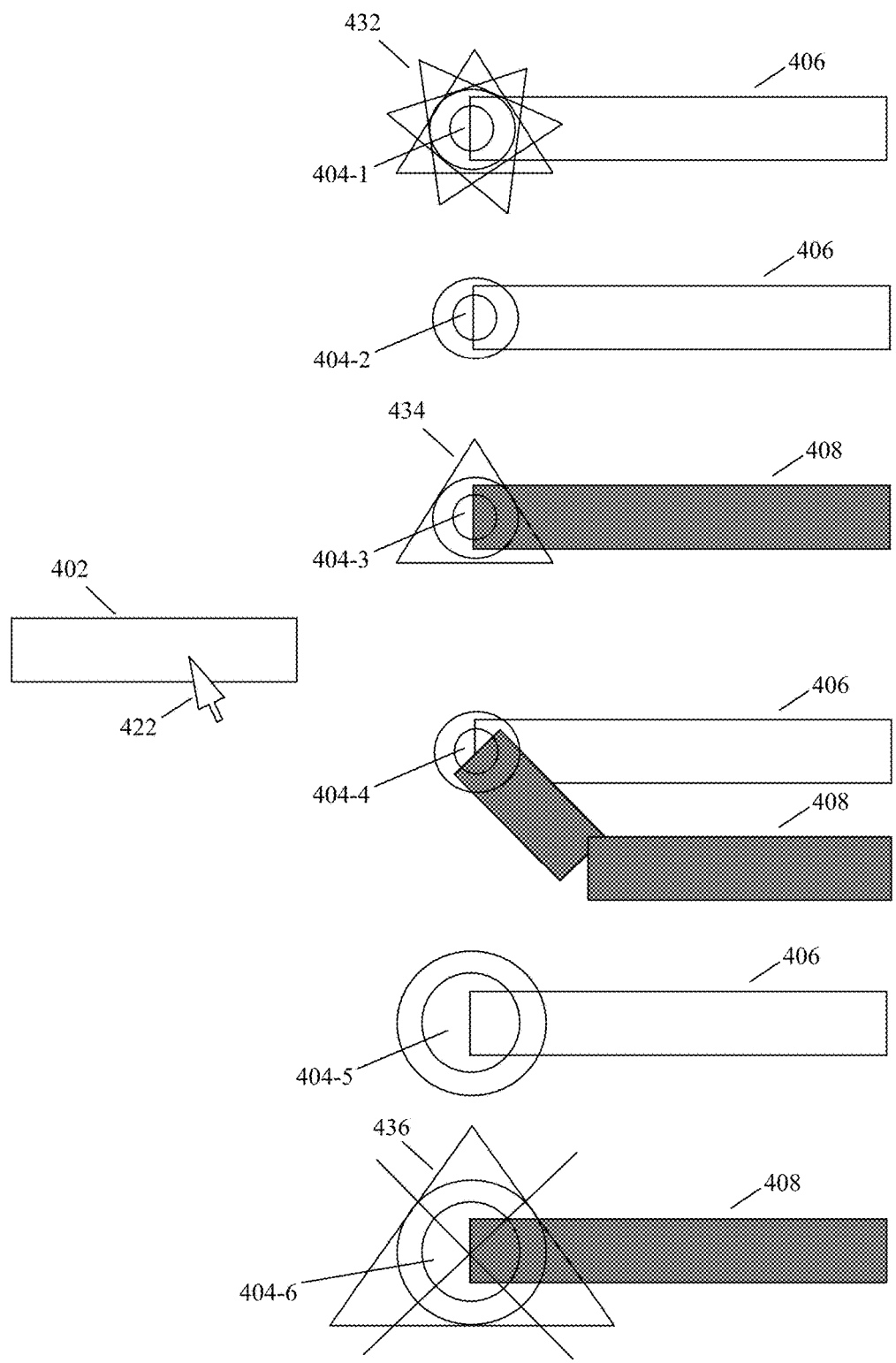
FIG. 4 illustrates examples of how graphical indicators are interactive displayed during routing of traces using poly vias according to the embodiments.

FIG. 4 illustrates example displays and graphical indicators that are provided during interactive routing of traces or vias in PCB layouts using vias that include candidates for shared poly vias according to the present embodiments.

In these examples, displays and indicators will be described in connection with routing and/or layout editing where a dynamic trace is at the cursor (e.g., trace 402 at white cursor 422 via point and click or hover). However, similar displays and indicators can be provided when a dynamic via is at the cursor (e.g., for moving or editing an existing via). As in the example of FIG. 2, traces 406 that are in the same layer as trace 402 are displayed in the same color as trace 402, while traces 408 that are not in the same layer as trace 402 are displayed using different colors.

Assume that, in this example, a user is editing a layout in layer 1 (e.g., a top PCB layer) and that the PCB includes six total layers. Further assume that, in this example, via 404-1 uses a conventional drill hole through all six layers, while vias 404-2 to 404-6 use drill holes that are formed using new manufacturing technologies and thus include an isolation cut or spacer between the top and bottom three layers.

Still further, in this example, assume the following conditions exist: (1) the drill hole of existing via 404-1 is currently being used by trace(s) 406 in the same net as trace 402; (2) the upper half (e.g., layers 1-3) of the drill hole of existing via 404-2 is currently being used by trace(s) 406 in a different net as trace 402, while the lower half (e.g., layers 4-6) of the drill hole is available; (3) the lower half of the drill hole of existing via 404-3 is currently used by trace(s) 408 in a different net as trace 402, while the upper half of the drill hole is available; (4) the upper half of the drill hole used by existing via 404-4 is currently being used by trace(s) 406 in a different net as trace 402, while the lower half of the drill hole used by existing via 404-4 is currently being used by trace(s) 408 in another different net as trace 402; (5) the upper half of the drill hole used by existing large via 404-5 is currently being used by trace(s) 406 in a different et as trace 402, while the lower half of the drill hole is available; and (6) the lower half of the drill hole used by existing large via 404-6 is currently being used by trace(s) 408 in a different net as trace 402, while the upper half of the drill hole is available.

Accordingly, in this example, when a user editing dynamic trace 402 part of net "A" on layer 1 (e.g., a top PCB layer) wants to route trace 402 to a pin in another layer in the upper half of the PCB (e.g., layers 2 or 3), the candidates for use as shared poly vias to merge into at the next pick are vias 404-1 (because it is currently being used by net "A"), 404-3 (because the upper half of the drill hole is available), and 404-6 (because the upper half of the drill hole is available), and are shown with extra figures drawn 432, 434 and 436, respectively. The user is therefore, at least initially, encouraged to pick one of these vias. Meanwhile, vias 404-2, 404-4, and 404-5 are not candidates, since the upper halves of the drill holes they use are currently in use by different nets. So no extra figures are shown and the user is thereby not encouraged to pick one of these vias.

With no via at the cursor 422, which is the case shown in FIG. 4, the hole size of existing vias has no effect on whether the triangles are shown. Accordingly, in this example, vias 404-2 and 404-5 have different hole sizes, and have no triangles shown. Vias 404-3 and 404-6 have different hole sizes, and have triangles shown. Moreover, as set forth previously, shared poly vias may have two networks per drill hole (via 404-4 is an example), but this is not a limitation, as three or more networks are allowed.

Although not applicable to the case where only a dynamic trace with no via is selected by the cursor 422, the example shape 436 shown in FIG. 4 further indicates a possible display in a case where a dynamic via having a small size was being pointed to by the cursor 422 or otherwise specified by the user. In this case, as shown by shape 436, since a hole size adjustment may be needed for large via 404-6, this is further indicated with an "X".

As set forth above, displays and indicators similar to the above examples can be provided when a dynamic via is at the cursor (e.g., for moving or editing an existing via) rather than a dynamic trace. It should be noted that, however, differently from existing techniques, the movement of the dynamic via can be allowed to overlap or come near to an existing via that is a candidate for use as a shared poly via. This has an advantage of easily allowing multiple vias to be merged into a single via, which can save PCB real estate.

Moreover, when dynamically editing traces or vias, in addition to providing the graphical indicators for candidate shared poly vias described above, the user interface can include a cursor-snap feature for guiding and causing the interactive edits to quickly and properly align routing/vias onto the existing drill holes.

Figure 5:
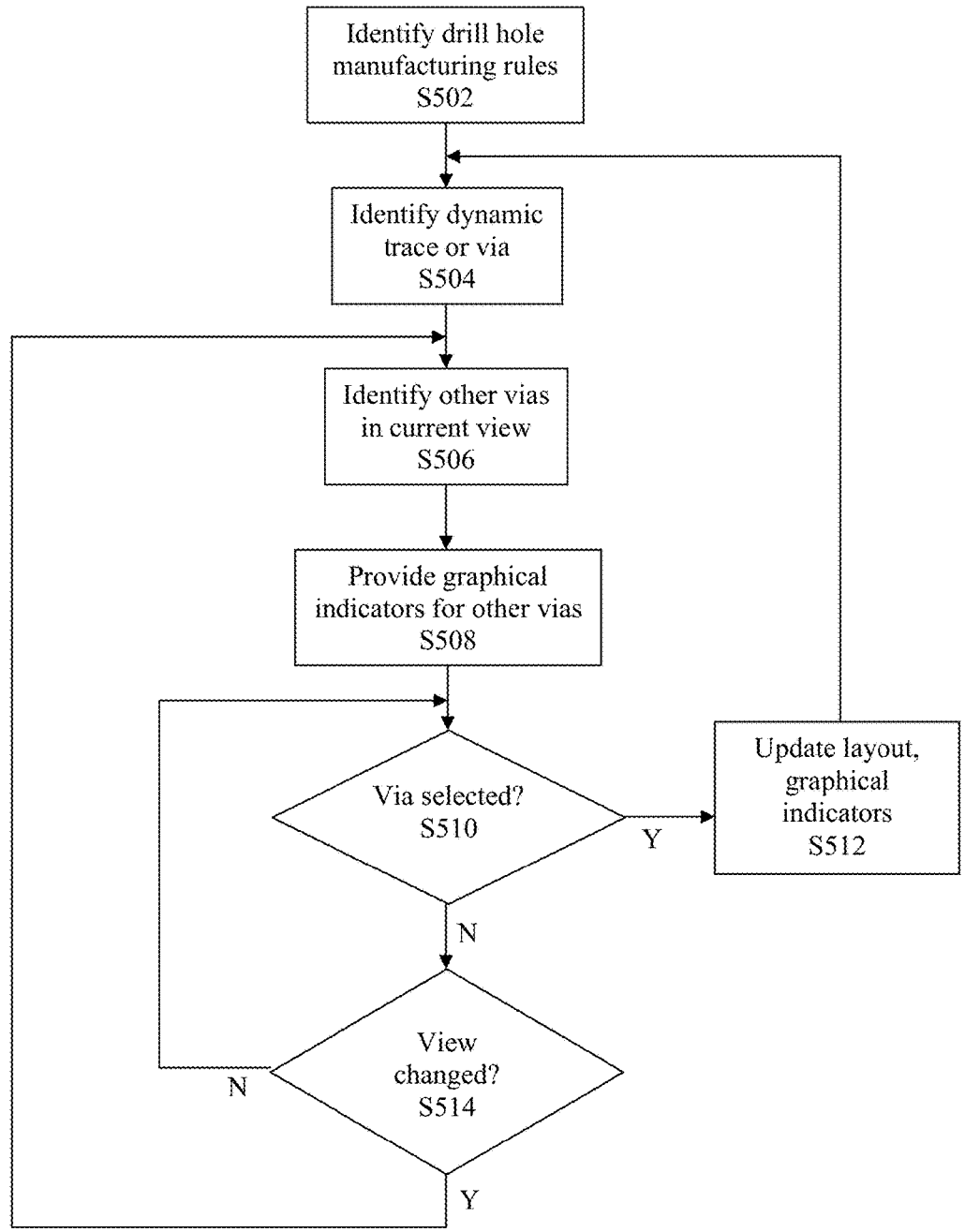
FIG. 5 is a flowchart illustrating an example methodology for allowing interactive routing of traces using poly vias according to the embodiments.

FIG. 5 is a flowchart illustrating an example methodology for interactive routing using poly vias according to the present embodiments.

As shown in this example, in addition to other conventional initialization activities for editing a PCB layout (e.g., loading the current PBC layout including set of traces, pins and vias, their locations in the layout, the different nets, etc.) another initial step S502 according to embodiments includes identifying the drill hole manufacturing rules for the current PCB design. This includes what types of vias or drill holes are available for use as multi-net drill holes using new manufacturing technologies, as well as which layers of the PCB in the drill holes can be separated from other layers (e.g., a single drill hole can be used by one net in layers 1-3, and another net in layers 4-6). These rules can be provided along with other manufacturing rules for a given PCB manufacturer, for example.

During editing of the PCB layout (e.g., after a particular editing state or set of functionality of a layout editor or tool has been selected), a dynamic trace or via is identified in step S504. This can occur, for example, when a user has selected a particular layer to edit, a particular zoom level, and has clicked on or hovered over a particular trace or via in the layer been viewed and/or has otherwise selected for editing.

Once the trace or via is identified, information about it is obtained, such as the net to which the trace or via belongs, current layer information, etc. Other information can include, for dynamic traces, another layer to which the user wants the trace to transition to (e.g., via a popup or dialog box). Moreover, in step S506, similar information about all the other traces and vias currently within the view of the display along with the dynamic trace or via is obtained (e.g., layers, nets and traces currently being used by the other vias, etc.). Based on that information, additional graphical indicators for other vias that are candidates for use as shared poly vias are overlayed on the displayed vias in the view, such as the example indicators shown in FIG. 3.

In this example, further processing relevant to the present embodiments occurs whenever an existing via is selected for use by the dynamic trace or via (as determined in step S510), or when the view has changed as determined in step S514 (e.g., the zoom level has changed, the window over the layout has been moved and/or the user no longer wants to edit the currently selected trace or via).

If it is determined in step S510 that an existing via is selected for use by the dynamic trace or via, the design of the layout and displays of graphical indicators are updated accordingly in step S512. Processing then returns to step S504 for identification of another trace or via in the current or another layer of the design.

If it is determined in step S514 that the the view has changed (e.g., the zoom level has changed, the window over the layout has been moved), processing returns to step S506 where all of the vias in the new view of the layout are identified as shown in this example. If it is otherwise determined in step S514 that the user is no longer interested in editing the currently selected trace or via, processing may instead return to step S504.

It should be noted that the flowchart of FIG. 5 is simplified for illustrating aspects of the present embodiments, and that it can be adapted and changed so as to be included in an overall design or layout editing flow along with other design or layout editing functionality. However, such additional functionality will not be described here for the sake of a clear understanding of the present embodiments.

Figure 6:
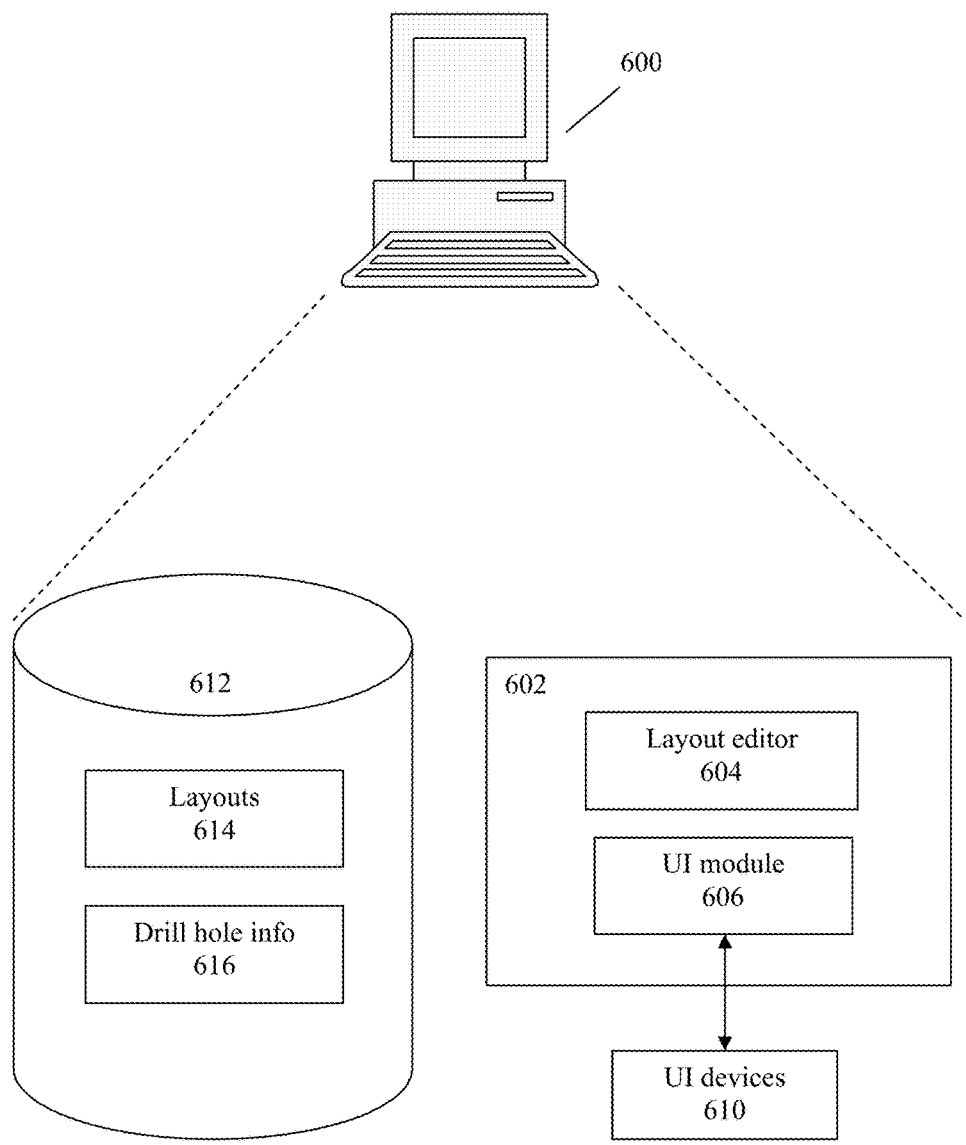
FIG. 6 is a block diagram illustrating an example system for allowing interactive routing of traces using poly vias according to the embodiments.

FIG. 6 is a block diagram of an example system for interactive routing with poly vias according to the present embodiments.

As shown, the system 600 includes an routing tool 602 including a PCB layout editor 604 and user interface module 606 that have been adapted with the shared poly via routing functionality of the present invention. It should be noted that the principles of the present embodiments are not limited to PCB routing tools, and those skilled in the art will understand how to extend these principles to other types of EDA tools after being taught by the present examples.

In these and other embodiments, routing tool 602 may include additional interactive or automated modules for interactively implementing designs for PCBs that are not shown such as floorplanners, design rule checkers, a verification engine, signal and power integrity checkers, etc. as will be appreciated by those skilled in the art. In other embodiments, routing tool 602 is a standalone application that only includes routing and/or layout editor functionality and/or is adapted to communicate with other automated EDA modules.

In embodiments, system 600 can be implemented by one or more general purpose computers that are loaded with an operating system executing software and/or customized to include hardware for interactively implementing physical electronic designs and adapted with the poly via functionality of the present disclosure. In some embodiments, the one or more computing systems comprise and/or communicate with various components not shown such as the processor(s) or processor core(s), memory, disks, etc. The one or more computing systems may further write to and read from a local or remote volatile or non-volatile computer accessible storage not shown that stores thereon data or information such as, but not limited to, one or more databases 612 such as physical design database(s), libraries, data, rule decks, constraints, etc. and/or other information or data that may be required to support the methodology of the present embodiments. In some embodiments, the one or more computing systems are implemented in a "cloud" configuration and/or a client/server configuration. For example, one or more server computers may be loaded with application software (e.g., a layout editor tool) for implementing some or all of the methodology of the present embodiments, and one or more client computers can communicate with the server computer(s) via a network to perform some or all of the methodology of the embodiments for a particular design.

In operation, a user can interact with layout editor tool 604 via user interface module 606 to operate on dynamic traces or vias as described above. In addition, when layout editor 604 is being used to create or modify a portion of a PCB design stored in layouts 612, using the methodology described above, for example, in response to user actions conducted using interface devices 610 (e.g., mouse, trackball, touchpad, touchscreen, etc.) and user interface 606, layout editor 604 accesses drill hole configurations or rules 616 in database 612 and creates graphical indicators for shared poly via candidates and displays them to the user via user interface devices 610 (e.g., display monitor) and user interface 606. Layout editor 604 can further include conventional functionality for receiving and updating PCB design and/or layout information (e.g., SI data) for the current design in layouts 612 in response to the user actions.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method of implementing a layout of a circuit in a circuit structure, comprising:
   identifying a trace of the layout, the trace having an associated layer in the circuit structure;
   identifying another layer in the circuit structure to which the trace needs to transition;
   identifying an existing via in the layout;
   determining whether the existing via can be used to connect to the trace for transitioning to the another layer, wherein determining whether the existing via can be used includes determining whether the existing via is comprised of a drill hole that allows use by multiple nets; and
   adjusting a graphical indicator associated with the existing via in a display of the layout based on the determination.

2. The method of claim 1, wherein determining whether the existing via can be used includes determining whether one or more other traces are currently connected to the existing via.

3. The method of claim 2, wherein determining whether the existing via can be used further includes, if one or more other traces are currently connected to the existing via, and if the existing via is comprised of a drill hole that allows use by multiple nets, determining whether the another layer is in a portion of the drill hole not connected to by the one or more other traces.

4. The method of claim 2, wherein determining whether the existing via can be used further includes, if one or more other traces are currently connected to the existing via, determining whether the one or more other traces belong to a same net as the trace.

5. The method of claim 1, wherein without the adjusting, the existing via is displayed with one or more circles, and wherein adjusting the graphical indicator includes displaying one or more geometric shapes around the one or more circles based on the determination of whether the existing via can be used.

6. The method of claim 1, further comprising allowing the display of the trace to be snapped to the display of the existing via if it is determined the existing via can be used for connecting.

7. The method of claim 1, wherein the circuit structure comprises a printed circuit board.

8. A method of implementing a layout of a circuit in a circuit structure, comprising:
   identifying a trace of the layout, the trace having an associated layer in the circuit structure and a via for transitioning the trace to another layer in the circuit structure;
   identifying an existing via in the layout;
   determining whether the via of the trace with the existing via for transitioning the trace to the another layer, wherein determining whether the existing via can be merged includes determining whether the existing via is comprised of a drill hole that allows use by multiple nets; and
   adjusting a graphical indicator associated with the existing via in a display of the layout based on the determination of whether the vias can be merged.

9. The method of claim 8, wherein determining whether the existing via can be merged includes determining whether one or more other traces are currently connected to the existing via.

10. The method of claim 9, wherein determining whether the existing via can be merged further includes, if one or more other traces are currently connected to the existing via, and if the existing via is comprised of a drill hole that allows use by multiple nets, determining whether the another layer is in a portion of the drill hole not connected to by the one or more other traces.

11. The method of claim 9, wherein determining whether the existing via can be used further includes, if one or more other traces are currently connected to the existing via, determining whether the one or more other traces belong to a same net as the trace.

12. The method of claim 8, wherein without the adjusting, the existing via is displayed with one or more circles, and wherein adjusting the graphical indicator includes displaying one or more geometric shapes around the one or more circles based on the determination of whether the vias can be merged.

13. The method of claim 8, wherein determining whether the existing via can be merged further includes comparing widths of the via and the existing via.

14. The method of claim 13, wherein without the adjusting, the existing via is displayed with one or more circles, and wherein adjusting the graphical indicator includes overlaying one or more geometric shapes over the one or more circles if the widths of the via and the existing via are different.

15. The method of claim 8, further comprising allowing the display of the via to be snapped to the display of the existing via if it is determined the vias can be merged.

16. The method of claim 8, wherein the circuit structure comprises a printed circuit board.

17. A system for implementing a layout of a circuit in a circuit structure, comprising:
   a user interface module that is configured to allow a user to identify a trace of the layout, the trace having an associated layer in the circuit structure, the user interface module further being configured to allow the user to identify another layer in the circuit structure to which the trace needs to transition; and
   a layout editor coupled to storage containing information about the layout, the layout editor being configured to identify an existing via in the layout based on the information and the identification of the trace from the user interface module, and to determine whether the existing via can be used to connect to the identified trace for transitioning to the another layer,
   wherein the layout editor is further configured to interact with the user interface module so as to adjust a graphical indicator associated with the existing via in a display of the layout based on the determination, and
   wherein the layout editor is configured to determine whether the existing via can be used by accessing a storage containing information regarding whether the existing via is comprised of a drill hole that allows use by multiple nets, and to determine whether the another layer is in a portion of the drill hole connected to by one or more other traces in the layout.

18. The system of claim 17, wherein without the layout editor performing the adjusting, the existing via is displayed with one or more circles, and wherein adjusting the graphical indicator includes displaying one or more geometric shapes around the one or more circles based on the determination of whether the existing via can be used.

19. The system of claim 17, wherein the circuit structure comprises a printed circuit board.

* * * * *